United States Patent [19]

Dumont

[11] Patent Number: 4,685,092

[45] Date of Patent: Aug. 4, 1987

[54] METHOD AND APPARATUS FOR THE ACOUSTIC INSPECTION OF A BOREHOLE FITTED WITH CASING

[75] Inventor: Alain Dumont, Paris, France

[73] Assignee: Schlumberger Technology Corporation, New York, N.Y.

[21] Appl. No.: 772,594

[22] Filed: Sep. 5, 1985

[30] Foreign Application Priority Data

Sep. 5, 1984 [FR] France ................ 84 13673

[51] Int. Cl.⁴ .............................................. G01V 1/40
[52] U.S. Cl. ....................................... 367/35; 181/104
[58] Field of Search .................... 367/35, 25; 181/104, 181/105; 364/422; 73/151, 153

[56] References Cited

U.S. PATENT DOCUMENTS

| | | |
|---|---|---|
| 3,175,639 | 3/1965 | Liben ........................................ 181/5 |
| 4,255,798 | 3/1981 | Havira ..................................... 367/35 |
| 4,382,290 | 5/1983 | Havira ..................................... 367/35 |
| 4,571,693 | 2/1986 | Birchak et al. ....................... 364/422 |

FOREIGN PATENT DOCUMENTS 0089892 3/1983 European Pat. Off. .
2491123 9/1980 France .

OTHER PUBLICATIONS

"Schlumberger's Cement Evaluation Tool" published 6/83.
U.S. Ser. No. 767,933 to G. Catala, et al. entitled "Method for Evaluating the Quality of Cement Surrounding the Casing of a Borehole".

Primary Examiner—Thomas H. Tarcza
Assistant Examiner—Ian J. Lobo
Attorney, Agent, or Firm—David P. Gordon; David G. Coker

[57] ABSTRACT

A logging method and apparatus are provided for the acoustic inspection of a borehole fitted with a casing wherein obtained measurements which are representative respectively of one or more data items relating to the casing and to the material which surrounds it are corrected for the effects of the environment. The method comprises: emitting a first acoustic pulse through the medium present in the casing and directed at a substantially normal incidence towards a sector of the wall of the casing; obtaining a first reflected acoustic signal corresponding to said emitted pulse; emitting through said medium a second acoustic pulse directed at a substantially normal incidence towards a reference reflector whose nominal characteristics are substantially similar to those of said sector of the casing being investigated; obtaining a second reflected acoustic signal corresponding to said second emitted pulse; and from at least a selected portion of said first obtained signal and a selected portion of said second obtained signal, forming one or more corrected signals representative respectively of one or more data items relating to at least said casing. This correction eliminates effects due to the medium inside the casing and to the geometry of the casing. The data items relating to the casing and to the materials which surround it generally include the quality of the connection between the casing and the cement disposed behind the casing, the roughness of the inside wall of the casing, and the thickness of the casing.

21 Claims, 7 Drawing Figures

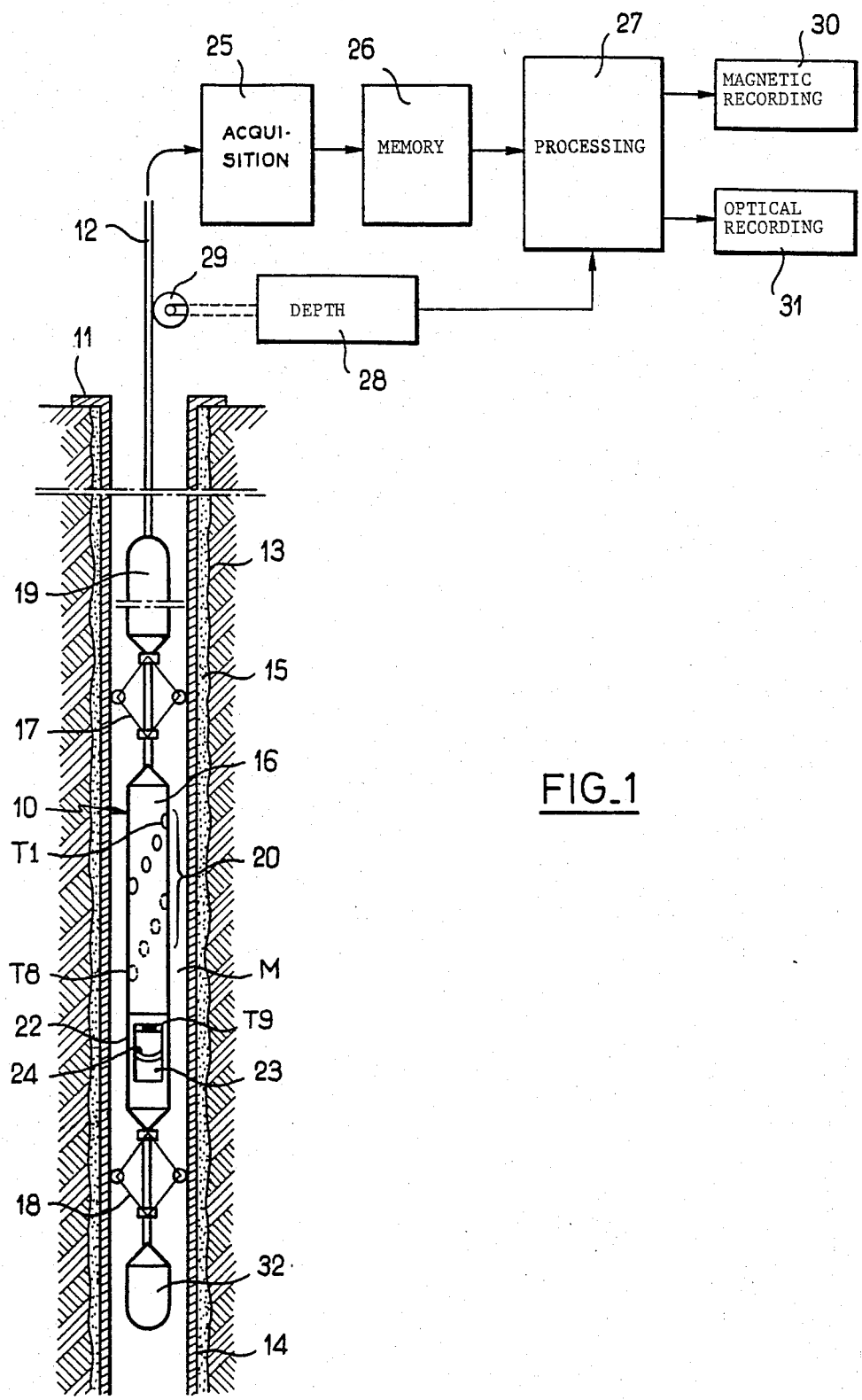
FIG_1

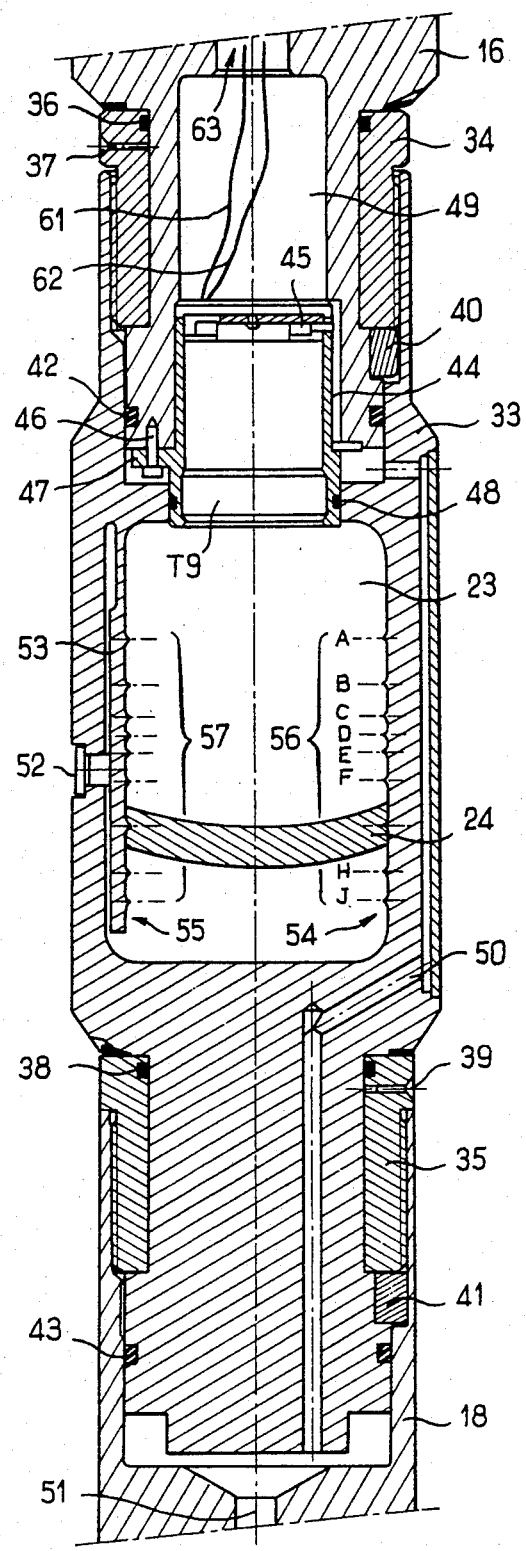
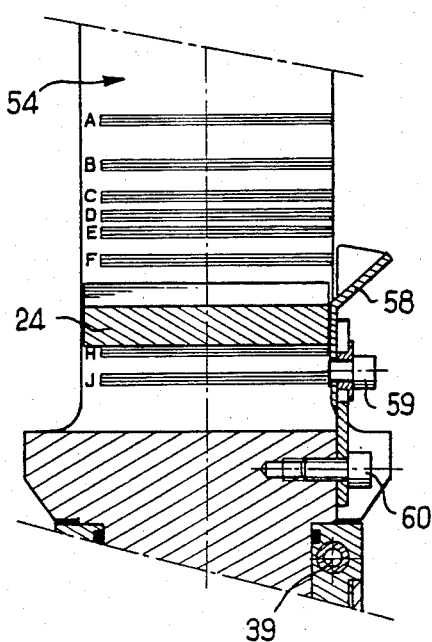
FIG_2
FIG_3

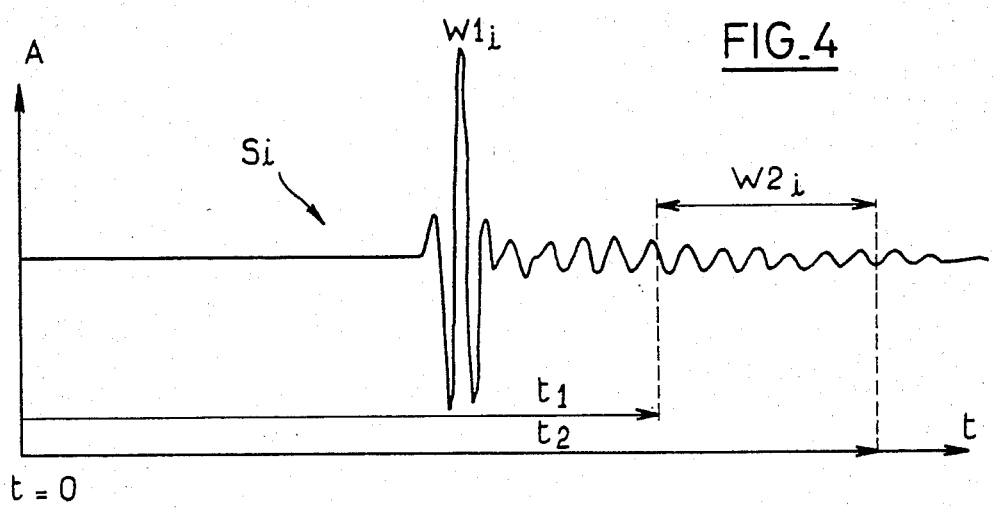
FIG_4
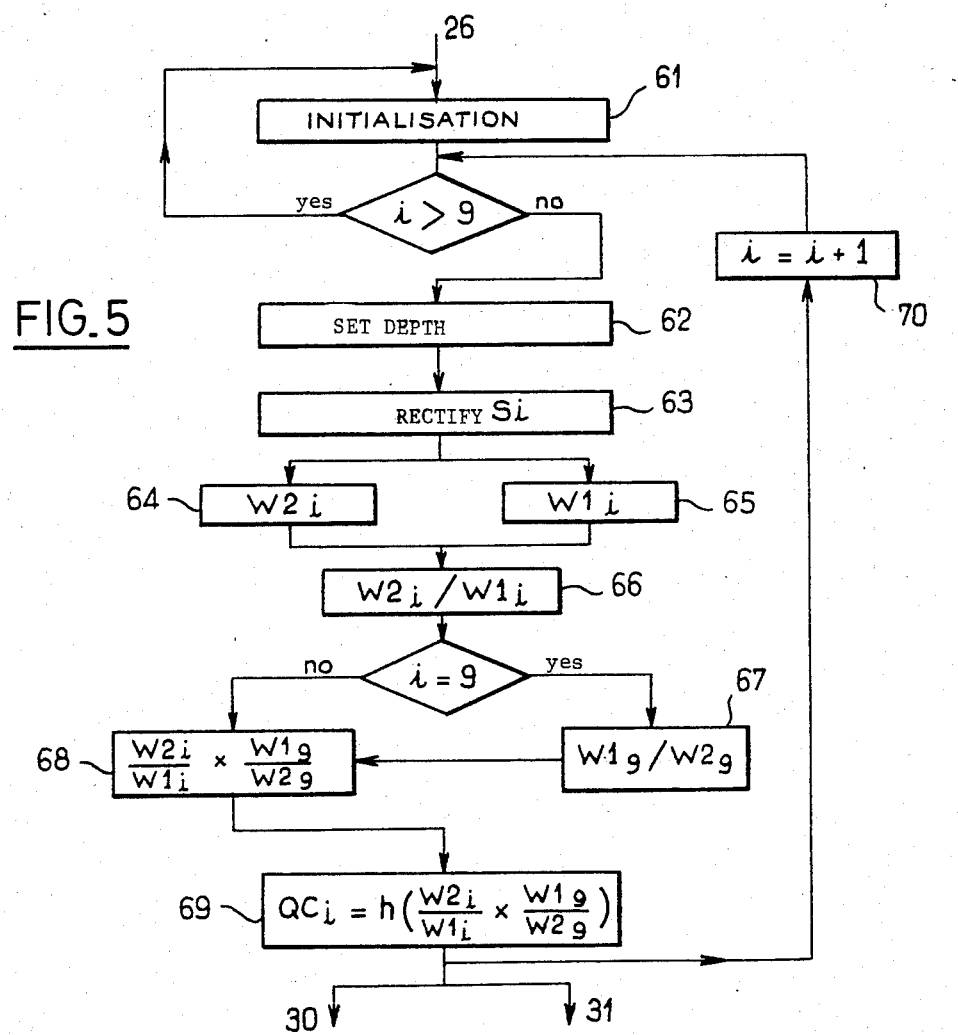
FIG_5

METHOD AND APPARATUS FOR THE ACOUSTIC INSPECTION OF A BOREHOLE FITTED WITH CASING

BACKGROUND

The present invention generally relates to a method and apparatus for the acoustic inspection of a borehole fitted with a casing and passing through ground formations. More particularly, the invention relates to a method and apparatus for providing environmental correction to measurements obtained by using an acoustic pulse technique for forming signals representative respectively of one or more data items relating to the casing and to the material which surrounds it. The data items relating to the casing and to the materials surrounding the casing include, in particular, the quality of the connection of the cement with the casing, the casing thickness, and the roughness of the inside wall of the casing. For purposes of definition herein, it should be understood that the "environmental correction" and the "environment" as used herein will refer to the correction for, and the environment of the investigating tool, i.e. the mud or fluid surrounding the tool in the casing, and the casing itself.

Generally, when a borehole has reached a desired depth, casing is placed therein and cement is injected into the annular space formed between the casing and the wall of the borehole in order to prevent any hydraulic communication between the various geological layers. To determine whether any such unwanted communication still exists, measurements are performed by means of a logging tool for determining the quality of the link between the cement and the casing. Logging tools using acoustic waves to perform such measurements have been available to the art for a very long time. However, most of the logging tools rely on an average circular measurement and/or an average longitudinal measurement (along the casing), and consequently are not capable of identifying spot phenomena, such as longitudinal hydraulic communication channels.

Of the various techniques seeking to employ vertical and radial resolution to cement-to-casing quality measurements, that described in U.S. Pat. No. 4,255,798 to Havira, and assigned to the assignee herein, appears to be of greatest interest. It generally comprises: sending an acoustic pulse at a radial sector of a casing, the pulse constituting acoustic waves whose frequencies are chosen so as to induce thickness resonance between the outer wall and the inner wall of the casing; determining the energy in a reverberation segment of the reflected signal; and forming a signal which is representative of the reflected signal to characterize the quality of the connection of the cement to the casing behind the said radial sector of the casing. the reverberation segment of the reflected signal is chosen so as to be substantially representative of the acoustic reverberation between the walls of the casing. Rapid damping of the resonance, i.e. low energy in the segment, indicates the presence of cement behind the casing, while slow damping, i.e. high energy, indicates the absence of cement.

A logging tool using the above-described technique is described in Schlumberger's commercial brochure entitled "Cement Evaluation Tool" which was published in June 1983. The sonde of this tool is centered in the casing. The tool generally comprises nine transmitter/receiver transducers. Eight transducers are helically distributed at 45 degrees so as to obtain good coverage of the periphery of the casing. Acoustic pulses are fired by the eight transducers sequentially and are likewise received sequentially before being analyzed and sent to the formation surface where they are processed. The ninth transducer, also referred to as a reference transducer, is pointed along the axis of the casing towards a reflecting wall which is planar and disposed at a fixed distance from the reference transducer. The reflected signal detected by the ninth transducer is used to determine the speed of propagation of the acoustic wave through the in situ fluid, as the distance between the reference transducer and reflecting wall is known, and the time interval between the emission and reception of the acoustic wave is determined. Using this speed of wave propagation, it is possible to determine the apparent radius of the casing for each of the eight transducers. This radius is a particularly interesting item of information, since it enables a detection of any deformation of the casing, and it also enables the centering of the sonde inside the casing to be monitored to give an indication of the validity and the quality of the recorded measurements.

The measurements performed with the above-described tool have confirmed that it is possible to identify certain hydraulic communication channels. An example of such an identification is to be found in FIG. 5 of French Pat. No. 2,491,123 to B. Seeman, assigned to the assignee herein, which describes a method and an apparatus for obtaining a recording of the quality of the cement. Despite this success, quantitative interpretation of such measurements have led to unexpected problems. In particular, there has been a divergence between measurements depending on the depth at which they are performed, the type of mud or fluid found in the borehole casing and on the geometry of the casing being analyzed.

Studies and experiments performed by the inventor have shown that a large portion of these differences can be attributed to the environment in which the measurement is taking place. In other words, the pressure and the temperature in the casing during measurement and, more particularly, the nature of the fluid in situ, have an effect on the obtained measurements. Indeed, the range over which these parameters may vary is very wide, with pressures of 100 bar to 1400 bar, temperatures of 20 degrees Celsius to 170 degrees Celsius, and mud densities in the range of 1 to 1.8 g/cm$^3$. Further, it has become apparent that the measurements also depend in a non-negligible manner on the geometry of the casing being analyzed and consequently on the casing diameter and thickness. Nevertheless, the tools of the prior art are not capable of correcting for effects due to variations in these "environmental" parameters.

SUMMARY OF THE INVENTION

It is therefore an object of the invention to provide a method and apparatus for the acoustic inspection of a borehole fitted with a casing, which susbstantially eliminates or reduces environmental effects.

According to a first aspect of the invention, a method for the acoustic inspection of a borehole fitted with casing and passing through ground formations comprises:

emitting a first acoustic pulse through the medium present in the casing and directed at a substantially normal incidence towards a sector of the wall of the casing;

obtaining a first reflected acoustic signal corresponding to said emitted pulse;

emitting a second acoustic pulse through said medium directed at a substantially normal incidence towards a reference reflector whose nominal characteristics are substantially similar to those of said sector of the casing being investigated;

obtaining a second reflected acoustic signal corresponding to said second emitted pulse; and from at least a selected portion of said first obtained signal and a selected portion of said second obtained signal, forming one or more corrected signals representative respectively of one or more data items relating to at least said casing.

Preferably, the second acoustic pulse should be of the same nature as the first acoustic pulse, and the second acoustic pulse should be emitted from a location close to the location where said first pulse was emitted. Also, preferably, the said characteristics of the said reference reflector particularly include its geometrical characteristics such as its thickness and its curvature. Typically, the one or more corrected signals represent one or more data items relating to said casing and to the materials surrounding the said casing.

The step of forming one or more corrected signals representative of one or more data items relating to at least the casing is advantageously practiced by: extracting a first series of signals relating to the said casing and to the materials surrounding it from at least a selected portion of said first reflected acoustic signal; extracting a second series of signals relating to the said reference reflector from at least a chosen portion of the said second reflected acoustic signal in the same manner as for the first signal; and combining said first series of signals with the second series of signals to obtain said one or more corrected signals. The information relating to the casing and to the materials surrounding it include, inter alia, the quality of the connection of the cement with the casing, the roughness of the inside wall of the casing and the thickness of the casing wall.

According to another aspect of the invention, a device for acoustically inspecting a borehole fitted with casing and passing through ground formations comprises:

at least one acoustic transducer capable of emitting a first acoustic pulse directed at a substantially normal incidence towards at least a sector of said casing wall, and capable of detecting a first reflected acoustic signal corresponding thereto;

a reference reflector whose nominal characteristics are substantially similar to those of the said casing, wherein said reference reflector has two faces and both of the faces are immersed in a fluid present inside said casing;

a reference acoustic transducer capable of emitting a second acoustic pulse directed at a substantially normal incidence towards said reference reflector, and capable of detecting a second reflected acoustic signal corresponding thereto; and means for forming one or more corrected signals representative respectively of one or more data items relating to at least the said casing, said corrected signals being formed from the said first reflected acoustic signal and said second reflected acoustic signal.

In a preferred embodiment, the distance between the front face of each of the measuring transducers and the outer wall of the casing is substantially equal to the distance between the front face of the reference transducer and the rear face of the said reference reflector, and the thickness and the curvature of the reference reflector are preferably substantially identical to the thickness and curvature of the casing being investigated. Also, preferably, the means for forming one or more corrected signals include means for obtaining the ratio of the magnitude of said first detected signal respectively measured in one or more windows and the magnitude of said second detected signal respectively measured in corresponding windows. The magnitude of the detected signals may include the amplitude and/or energy of the signals, as well as the frequency and phase of the signals.

A better understanding of the invention, and additional advantages and objects of the invention will become apparent to those skilled in the art upon reference to the detailed description in conjunction with the accompanying drawings.

BRIEF DESCRIPTION OF THE DRAWINGS

FIG. 1 is a diagram of apparatus for studying the quality of cement in accordance with the invention, the apparatus being represented in the course of operation in a borehole;

FIG. 2 is a longitudinal section through the portion of the apparatus including the reference transducer in association with the reference reflector;

FIG. 3 is a longitudinal section through a portion of FIG. 2;

FIG. 4 shows a reflected acoustic signal such as detected by a transducer of the apparatus invention;

FIG. 5 is a flow chart showing the processing steps performed on the detected signals;

DETAILED DESCRIPTION OF THE PREFERRED EMBODIMENTS

Figure 6:
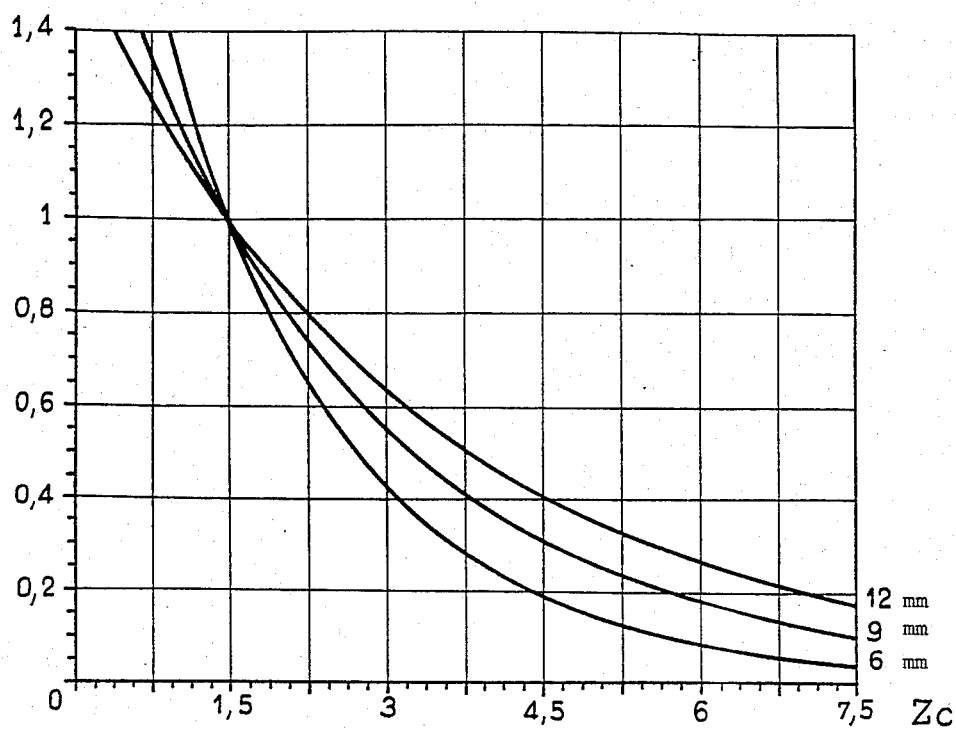
FIG. 6 is a graph showing the relationship between the acoustic impedance of the cement surrounding the casing and the energy contained in a reverberation segment of the reflected signal.

With reference to FIG. 1, the acoustic logging apparatus of the invention for investigating the quality of cement surrounding a casing disposed in a borehole, comprises a tool 10 suspended at the end of a multiconductor cable 12. The tool 10 is shown located in a borehole 11 and immersed in a surrounding medium M. The borehole 11 passes through formations 13 and is fitted with casing 14. Cement 15 occupies the annular space delimited by the casing and the formations. Preferably, the logging device of the invention includes the basic characteristics of the device described in the above-mentioned U.S. Pat. No. 4,255,798. Typically the tool 10 is an elongate body which comprises a sonde 16, an upper centering device 17 and a lower centering device 18 for maintaining the sonde 16 centered along the axis of the casing 14, an acoustic compensation section 22, a hydraulic compensation section 32, and an electronic section 19.

The sonde 16 preferably is equipped with eight acoustic transducers T1 to T8 (generally denoted 20) which are disposed helically so as to make it possible to investigate eight sectors of casing regularly spaced around the casing periphery. In the embodiment shown in FIG. 1, the angular position of each transducer is rotated by 45 degrees about the axis of the casing relative to the preceding transducer. Other arrangements are obviously possible without going beyond the scope of the invention, such as having different numbers of transducers and/or different distributions around the sonde.

The centering devices 17 and 18 are of known type in which means are provided (not shown) enabling electrical and/or hydraulic links to pass between the upper portion and the lower portion of each of the centering devices. Likewise, the hydraulic compensation section 32 is of known type in which the fluid of the hydraulic circuits of the tool 10 is subjected to the pressure of the surrounding medium M, (i.e. to the hydrostatic pressure of the borehole) in such a manner as to avoid excessive differential pressures on sensitive portions of the sonde such as the transducers.

The acoustic compensation section 22 of tool 10 has a hollow 23 which is open to the fluid M. A ninth transducer T9, similar to the transducers T1 to T8, acts as a reference transducer by emitting acoustic waves through the hollow 23 towards a reflector 24 also placed on the hollow 23. The waves are preferably emitted along an axis which is substantially the same as the axis of the sonde 16. The reflector 24 is substantially perpendicular to the emission axis of the transducer T9 and is arranged to simulate a radial sector of the casing 14 under study (see FIGS. 1 and 2).

Each transducer Tn (T1 to T9) is controlled to emit short duration acoustic pulses whose spectrum covers the range of frequencies situated from 300 kHz to 600 kHz with the average frequency being about 500 kHz. The transducers T1 to T8 are arranged to emit radially while the transducer T9 is arranged to emit longitudinally. Each emitted pulse is reflected by the various interfaces which it encounters, i.e. the casing 14, cement 15, and formation 13 for the transducers T1 to T8, and the reflector 34 for the transducer T9, thereby giving echo signals which are detected by the same transducer. The detected signals which may be characterized by their magnitudes, i.e. their particular amplitudes, energies, frequencies and phases, are transmitted via suitable cabling (not shown) passing through the centering device 17 to the electronics section 19 wherein they are sampled at a selected rate, digitized, multiplexed, and finally transmitted to the surface by a modem (not shown) connected to conductors in the cable 12.

At the surface, the cable conductors are connected to an acquisition system 25 comprising a modem for decoding the transmitted data, followed by a demultiplexer. The signals are then stored in a memory 26. The memory is connected to a computer 27 such as a PDP-11 manufactured by Digital Equipment Corp. of Maynard, Mass., which is suitable for performing a series of processing steps which are explained in greater detail below for each borehole depth level of the tool 10. Signals representative of the depth of the apparatus 10 are generated by a displacement detector comprising a pulse generator 28 controlled by a wheel 29 bearing tangentially against the cable 12. The pulse generator 28 delivers one pulse each time the cable 12 is displaced by a unit of length.

The processing performed by the computer 27 (or any dedicated hardware or calculator capable of performing processing) provides a first set of output signals to a magnetic recorder 30 which stores them in numerical form on a magnetic tape for each borehole depth level. This magnetic recording contains, in particular, the signals (or a series of signals representative thereof—energy, amplitude, etc.) delivered by the transducers T1 to T9 and consequently makes subsequent processing of the data possible. Also for each depth level, the computer 27 provides a second set of signals to an optical recorder 31 which provides a graphical recording on a film, e.g. of the type described in French Pat. No. 2,491,123 to B. Seeman.

Turning to FIG. 2, the acoustic compensation section 22 comprises a body 33 having its upper portion connected to the sonde 16 and its lower portion connected to the centering device 18. The upper connection and the lower connection are respectively provided by nuts 34 and 35, each of which is in the form of two half-rings (not shown) for assembly reasons. The nut 34 is free to rotate on a groove in the sonde 16, with the friction area between the two parts being isolated from the outside fluid by a sealing ring 36 which is lubricated by a greaser 37. Likewise, the nut 35 is free to rotate over a groove in the body 33 with the friction area between the two parts being isolated from the outside fluid by a sealing ring 38 which is lubricated by a greaser 39. An alignment pin 40 is provided in such a manner as to prevent the body 33 from rotating relative to the sonde 16. A second pin 40 prevents the body 33 from rotating relative to the centering device 18. Sealing between the sonde 16 and the body 33 and between the body 33 and the centering device 18 is provided by respective sealing rings 42 and 43.

The reference transducer T9 is fixed in its housing 44 by means of a pin 45. Two electrical conductors 61 and 62 placed in the hydraulic duct 63 of the sonde 16 connects the transducer T9 to the electronics section 19. The housing 44 situated in chamber 49 of the sonde 16 is maintained on the end face of the sonde 16 by means of three similar screws 46 passing through three fixing lugs 47 at 120 degree intervals. Sealing is provided between the body 33 and the housing 44 by means of a sealing ring 48. The chamber 49 is filled with hydraulic fluid and communicates with the duct 51 of the centering device 18 by means of the duct 50 of the body 33.

The body 33 has a hollow 23 open to the fluid M outside the sonde. Each of the two opposing faces (54, 55) of the hollow 23 comprises a set of slides (56, 57) which are parallel to one another and perpendicular to the axis of the section 33. These slides (of which there are nine in the embodiment described) serve to position the selected reflector 24. This selection is performed as a function of the diameter of the casing under study and of its thickness. Each of the slides corresponds to a given nominal casing diameter. The following table gives an illustrative but non-limiting example of correspondences between each slide and the corresponding casing diameter commonly used in the oil industry.

| Slide | Casing (inches) | diameter (mm) |
| --- | --- | --- |
| A | 4½ | 114 |
| B | 5 | 127 |
| C | 5½ | 140 |
| D | 6⅝ | 168 |
| E | 7 | 178 |
| F | 7⅝ | 194 |
| G | 8⅝ | 219 |
| H | 9⅝ | 244 |
| J | 10¾ | 273 |

Each of these slides thus corresponds to a series of possible reflectors 24 having the same curvature, i.e. the curvature of the casing under investigation, and various different thicknesses. The shape of the reflectors corresponds to the section of the cylinder of the casing under consideration. For example, for slide E there are 8 different reflectors each having the same curvature, i.e. the curvature of 178 mm casing, but with each having a different thickness equal to one of the eight possible thicknesses of 178 mm diameter casings ordinarily used in the oil industry as indicated in the following table.

| 178 mm diameter casing | | |
|---|---|---|
| Weight per unit length of casing | | Thickness of the casing or of the reflector |
| (lb/ft) | (kg/m) | (mm) |
| 17 | 25.3 | 5.87 |
| 20 | 29.8 | 6.91 |
| 23 | 34.2 | 8.05 |
| 26 | 38.7 | 9.19 |
| 29 | 43.2 | 10.36 |
| 32 | 47.6 | 11.51 |
| 35 | 52.1 | 12.65 |
| 38 | 56.6 | 13.72 |

To cover the entire range of casing encountered, the total number of different reflectors required is approximately fifty. The reflectors preferably are made of material having similar acoustic characteristics to the materials of the casing, and according to the best mode, the reflectors are made of stainless steel. The reflectors 24 also are provided with two lateral grooves which enable them to be inserted and positioned in the corresponding slide. Once in position, a reflector 24 is locked into place by means of a screw 52 bearing on a blade 53 which is somewhat elastic. Those skilled in the art will understand that numerous variations are possible concerning the mode of positioning and/or of fixing the reflector 24. Moreover, while the device of the invention is described with the distance between the reference reflector 24 and the reference transducer T9 being adjustable by displacing the reflector 24, it is of course possible for this adjustment to be performed by moving the reference transducer T9.

With reference to FIG. 3, the acoustic compensation section 32 is provided with a deflector 58 which is adjustable so as to occupy an optimal position regardless of the slide used. The reflector 58 is fixed by means of two screws (59 and 60), and is used for the purpose of diverting a portion of the fluid present in the casing over the front surface of the reflector 24 so that the fluid present between the reference transducer T9 and reflector 24 is continously renewed as the tool 10 is moved. This fluid flow is designed to prevent debris from collecting inside the hollow 23 and to prevent the formation of a deposit of solid material on the surface of the reflector 24, as such a deposit would deteriorate the data extracted from the reflected acoustic signal. In addition, the fluid flow also ensures that the characteristics of the fluid remain homogeneous. Indeed, those skilled in the art will recognize that the homogeneity of the medium inside the casing is important. While measurements are made by the various transducers over the depth of the borehole and the results are depth-shifted for environmental correction, if the medium is not homogeneous, the measurements for the transducers and the reference transducer must be made close to each other to avoid different in situ propagation speeds. However, if the medium is homogeneous, the location of the correction transducer and measurement relative to the measuring transducers is not as critical (i.e. readings may be taken from at least a few feet apart).

Referring back to FIG. 2, the slides 24 are arranged in such a manner that the distance between the front face of the reference transducer T9 and the back face of the reflector 24 varies over an optimum range situated between 50 mm for the slide A and 115 mm for the slide J. For distances less than 50 mm, the detected signal is in danger of being degraded by multiple reflections from the face of the transducer and the reflective face, while for distances greater than 120 mm, the acoustic wave as received is in danger of being too strongly attenuated by the fluid M in the borehole.

The geometrical constraint applied to the distance between the front face of transducer T9 and the back face of the reflectors 24 is equally applicable to the distance between the radial transducers T1 to T8 and the borehole casing 14. In order to enable the sonde 16 to conduct satisfactory measurements over a wide range of casing diameters, the radial position of each of the transducers T1 to T8 is adjustable. Such adjustment is performed in conventional manner by means of a screw and nut system which moves a casing containing the measuring transducer in question in a radial direction.

In practicing the invention, once the nominal characteristics of the casing 14 to be analyzed are known, the corresponding reference reflector is selected and placed in the corresponding slide. According to a preferred embodiment, the radial position of the transducers T1 to T8 is then adjusted in such a manner that the distance between the front face of each of the transducers T1 to T8 and the outside wall of the casing 14 is equal to the distance between the front face of the reference transducer T9 and the back face of the reference reflector 24. Such a configuration represents an optimal simulation of casing 14 by the reference reflector 24 and permits a proper environmental correction for the obtained signals.

FIG. 4 shows the variations in the amplitude of a signal Si as a function of time as received by a transducer Ti. In accordance with U.S. Pat. No. 4,255,798 to Havira mentioned above, it is known to produce a signal QCi representative of the quality of the connection between the cement and the casing on the basis of the energy W2i measured in a reverberation segment of the reflected signal Si. The reverberation segment is chosen to be substantially representative of acoustic reflections between the walls of the casing. For example, the value of the energy W2i may be obtained after rectifying the signal Si, then integrating the rectified signal over a time interval t2—t1, where instants t1 and t2 are measured from the moment the acoustic wave is emitted. Clearly other methods can be used to obtain a value W2i (one or more of energy, amplitude, frequency, and phase) from the signal Si and these are known to the person skilled in the art. It is thus possible to write:

$$QCi = f(W2i) \text{ where } i = 1 \text{ to } 8 \tag{1}$$

Since an object of the invention is to eliminate the effects due to the environment (the fluid medium in the casing and the casing itself) on signals obtained to determine the quality of cement behind a casing, as mentioned above, the measured energy W2i is normalized relative to the corresponding energy W29 of the signal S9 received by reference transducer T9. Such normalization has the effect of eliminating variable factors due to the environment. In particular, the effects of the temperature, pressure and density of the medium M, as well as factors due to the geometry of the casing under study are eliminated thereby. Equation (1) can thus be put in the following form:

$$QCi = g(W2i/W29) \text{ where } i = 1 \text{ to } 8 \qquad (2)$$

in which W29 is the energy measured in signal S9 during identical time interval t2—t1.

In a preferred embodiment, while eliminating environmental effects, it may also be necessary to take account of the sensitivity of each of the transducers. Consequently, as disclosed in copending U.S. patent application Ser. No. 767,933, the ratio W2i/W1i may be utilized, where W2i is as defined above, and W1i represents the energy of a first segment corresponding to a first peak or maximum peak of the detected signal Si. Relationship (2) thus becomes:

$$QCi = h \frac{W2i}{W1i} \times \frac{W19}{W29} \qquad (3)$$

Functions g and h are simply deducible from function f. Function f is empirical and depends mainly on two parameters, the acoustic impedance of the mud or fluid inside the casing, and the nominal thickness of the casing, both of which are easily determined. The acoustic impedence of the mud is the product of the density of the mud multiplied by the speed of propagation of acoustic waves therethrough, the latter being measured by the signal S9. The nominal thickness of the casing is known by definition. Function f may be determined experimentally by providing different samples of different cements, and measuring W2 and the acoustic impedance for casings of different thickness (See FIG. 6). Then, a curve representing a function can be fit to the measured points. By way of a non-limiting example, such a function f is found in copending U.S. Ser. No. 767,933 as Equation 8.

Figure 7:
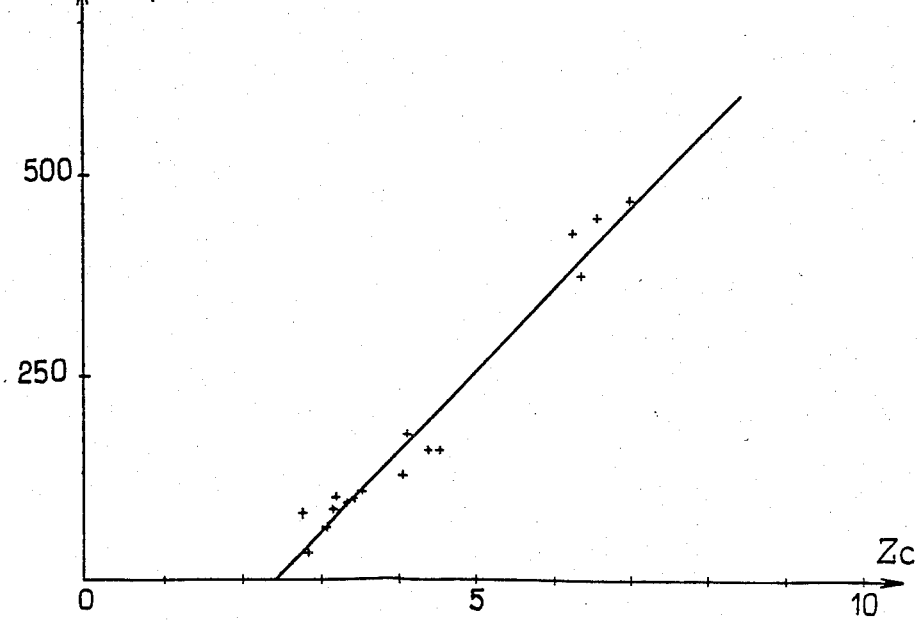
FIG. 7 is a graph showing the relationship between the acoustic impedance and the compression strength of the cement disposed behind the casing.

FIGS. 6 and 7 illustrate by way of non-limiting example the relationship for the case where the signal QCi can be taken as being the compression strength CS of the cement disposed behind the casing. FIG. 6 shows, in particular, the function relating energy W2 to the acoustic impedance of the cement Zc placed behind the casing, and it shows this function for various thicknesses of casing (6, 9 and 12 mm). FIG. 7 shows experimental points which establish the relationship between the acoustic impedance Zc and the compression resistance of the cement CS which in the present case is equal to QCi. Of course, it will be recognized that function f is essentially a function which predicts the propagation of sound in a casing having cement of different qualities surrounding it, and therefore function f may take a form other than that shown or described. However, the instant invention is intended to encompass such changes provided that the signals are environmentally corrected, at least, according to signal S9.

FIG. 5 is a flow chart of the correction processing or normalization performed by the computer 27. At the output from memory 26, the signals Si, each of which may include a series of signals relating to the amplitude, frequency, energy and phase of the detected signal, are directed to the computer 27 in which the processing is initialized by step 61. At 62, signals Si (where $0 < i < 10$) are associated with a particular depth, and the signals are then rectified at 63. At 64 and 65, the rectified signals are integrated during two time windows to produce magnitude signals W2i and W1i respectively. The ratio of the magnitudes W2i/W1i are obtained from the resulting signals at 66. For the index i=9 corresponding to the signal from the reference transducer, the value W19/W29 is placed at 67 in a buffer memory which is updated at each cycle so as to be able to form at 68 for each index $i < 9$ the ratio (W2i×W19)/(W1i×W29). At 69, the value Qci is calculated on the basis of this latter ratio using the function h of equation (3). Values Qci are then directed to the magnetic recording system 30 and the optical recording system 31 while the index i is incremented at 70. Once a complete cycle has been accomplished (i.e. $i > 9$) such that all the signals for a given depth have been analyzed, the processing is reinitialized.

While the invention has been described in terms of obtaining magnitudes of energy measurements in at least one time window, it is also possible to imagine a correction factor in which amplitude measurements would be used instead of energy measurements. It is known that the amplitude of the first peak of a received echo is directly linked to the roughness of the inside wall of the casing, and to the attenuation applied by the propagation medium. Thus, the correction method in accordance with the invention makes it possible to more accurately evaluate the roughness of the inside wall of the casing and thus its degree of corrosion by eliminating the environmental factor due to the attenuation of the propagation medium. In fact, this added advantage of the invention applies regardless of the range of frequencies used for the acoustic pulse.

Another application of the invention consists in the in situ correction of the function relating the thickness of the casing and its resonance frequency. This function has been described in the above-mentioned U.S. Pat. No. 4,255,798 to Havira. The correction method of the invention makes it possible to correct the relationship existing between the thickness of the reference reflector 24, which is known very accurately, and its resonant frequency which is extracted from the signal S9. This corrected relationship thus makes it possible to determine with high accuracy, the real thickness of the casing facing each radial transducer Ti as a function of the resonance frequency of the corresponding signal Si.

The correction and/or normalization method described in the context of the present invention may also serve for verifying and/or advantageously replacing other normalization techniques. In particular, the invention can be used in combination with, or to verify or replace the linear-type normalization technique described in copending U.S. patent application Ser. No. 767,933.

There has been described and illustrated herein an apparatus and·method for providing environmental correction to measurements obtained by using an acoustic pulse technique for forming signals representative respectively of one or more data items relating to at least the casing. While particular embodiments of the invention have been described, it is not intended that the invention be limited thereby, as it is intended that the invention be broad in scope and that the specifications be read likewise. Thus, for example, while the invention was described as using a computer located on the formation surface for processing information, those skilled in the art will appreciate that a portion or all of the signal Si may be processed downhole in a microprocessor provided for this purpose and located in the electronics cartridge 19. It is also possible, of course, to record the signal Si directly and to perform processing at a later date at a computer center located elsewhere. Moreover, while the invention was described as using a reference reflector which had characteristics similar to the casing itself, those skilled in the art could imagine the use of a reflector which had characteristics similar to a well-cemented casing. Thus, normalization (environmental correction) could be accomplished relative to the ideal (correct cementation) situation rather than relative to the situation where the casing is surrounded by fluid.

Further, while the invention was described as implementing a correction factor for a single window W2 in signals Si, those skilled in the art will appreciate that correction factors according to the invention could be utilized where more than two measuring windows would be used for each of the signals Si. Thus, a series of signals for each received signal Si could be extracted and corrected according to the environmental correction of the invention. Moreover, a series of signals including the amplitude, energy, phase, and frequency for each window could also be extracted and corrected according to the environmental correction of the invention. Therefore, it will become apparent to those skilled in the art that other changes and modifications may be made to the invention as described in the specification without departing from the spirit and scope of the invention as so claimed.

I claim:

1. A method for the acoustic inspection of a borehole fitted with a casing and passing through ground formations, comprising:
   (a) emitting a first acoustic pulse through the medium present in the casing and directed at a substantially normal incidence towards a sector of the wall of the casing;
   (b) obtaining a first reflected acoustic signal corresponding to said emitted pulse;
   (c) emitting though said medium a second acoustic pulse directed at a substantially normal incidence towards a reference reflector of at least a geometry and material substantially similar to those of said sector of the casing being investigated;
   (d) obtaining a second reflected acoustic signal corresponding to said second emitted pulse, wherein said second signal reflects information regarding at least said medium, said casing geometry, and said casing material; and
   (e) from at least a selected portion of said first obtained signal and a selected portion of said second obtained signal, forming one or more corrected signals in which the influences of said medium and said casing geometry and casing material are substantially eliminated, said corrected signals being representative of at least one data item relating to at least one of said casing and said material surrounding said casing.

2. A method according to claim 1, wherein said step (e) comprises extracting a first series of signals relating to said casing and to the materials surrounding said casing from at least a selected portion of said first reflected acoustic signal; extracting a second series of signals relating to said reference reflector from at least a selected portion of said second reflected acoustic signal, said selected portion of said second signal corresponding to said selected portion of said first signal; and combining said first series of signals with said second series of signals to obtain said one or more corrected signals relating to at least said casing.

3. A method according to claim 1, wherein said second acoustic pulse is of substantially the same nature as said first acoustic pulse; said second acoustic pulse is emitted from a second location close to a first location from where said first pulse was emitted.

4. A method according to claim 3, wherein the distance between said casing and said first location is substantially identical to the distance between said reference reflector and said second location.

5. A method according to claim 4, wherein said geometry of said reference reflector, including at least the curvature and the thickness of said reference reflector is substantially identical to the curvature and thickness of said casing.

6. A method according to claim 1, wherein said step of forming one or more corrected signals includes the step of finding the ratio between a magnitude of the signal measured in at least one time window of said first reflected acoustic signal with the magnitude measured in the corresponding time windows of said second reflected acoustic signal.

7. A method according to claim 6, wherein said signal magnitudes correspond to the energy of said reflected signals measured in said windows.

8. A method according to claim 6, wherein the frequency of said first and second acoustic pulses is preselected so as to cause thickness resonance to appear in said casing and in said reference reflector; and said corrected signals represent said data items relating to said casing and to the material surrounding said casing, and said data items include the quality of the connection between the casing and the layer of cement disposed behind the casing.

9. A method according to claim 8, wherein said reference reflector has characteristics substantially identical to an uncemented sector of said casing.

10. A method according to claim 6, wherein said signal magnitudes correspond to the amplitude of the reflected signal in said windows.

11. A method according to claim 10, wherein said data items relating to at least said casing include the roughness of the inside wall of the said casing.

12. A method according to claim 5, wherein said data items relating to said casing include the thickness of said casing in the sector of the casing at which said first acoustic pulse was directed.

13. An apparatus for acoustically inspecting a borehole fitted with casing and passing through ground formations, comprising:
   (a) at least one acoustic transducer capable of emitting through a medium inside said casing a first acoustic pulse directed at a substantially normal incidence towards at least a sector of said casing wall, and capable of detecting a first reflected acoustic signal corresponding thereto;
   (b) a reference reflector having at least a geometry and material substantially similar to those of the said casing;
   (c) a reference acoustic transducer capable of emitting a second acoustic pulse directed at a substantially normal incidence towards said reference reflector, and capable of detecting a second reflected acoustic signal corresponding thereto, wherein said second reflected acoustic signal reflects information regarding at least said medium, said casing geometry, and said casing material; and (d) means for forming one or more corrected signals in which the influences of said medium and said casing geometry and casing material are substantially eliminated, said corrected signals being representative of at least one data item relating to at least one of said casing and said material surrounding said casing, said corrected signals being formed from at least said first reflected acoustic signal and said second reflected acoustic signal.

14. An apparatus according to claim 13, wherein said reference reflector has two faces and both of said faces are immersed in said medium present inside said casing; and said means for forming one or more corrected signals includes means for extracting a first series of signals relating to the said casing and to the materials surrounding said casing from at least a selected portion of said first reflected acoustic signal, means for extracting a second series of signals relating to the said reference reflector from at least a chosen portion of the said second reflected acoustic signal in the same manner as for the first signal, and means for combining said first series of signals with the second series of signals to obtain said one or more corrected signals relating to at least said casing.

15. An apparatus according to claim 13 wherein the distance between the outside wall of said casing and the front face of said at least one measuring transducers is substantially equal to the distance between the front face of said reference transducer and the rear face of the said reference reflector.

16. An apparatus according to claim 15, wherein the geometry of said reference reflector, including both the curvature and the thickness of said reference reflector is substantially identical to the curvature and thickness of said casing.

17. An apparatus according to claim 14, wherein said means for forming one or more corrected signals includes means for finding the ratio between a magnitude of the signal measured in at least one time window of said first reflected acoustic signal with the magnitude measured in the corresponding time windows of said second reflected acoustic signal.

18. An apparatus according to claim 17, wherein said one or more corrected signals represents data items relating to the said casing and to the materials surrounding it, and said data items include the quality of the connection between the casing and the layer of cement disposed behind the casing.

19. An apparatus according to claim 18, wherein said reference reflector has characteristics substantially identical to an uncemented sector of said casing.

20. An apparatus according to claim 17, wherein said data items relating to said casing include the roughness of the inside wall of said casing.

21. An apparatus according to claim 16, wherein said data items relating to the said casing include the thickness of the said casing.

* * * * *